(12) United States Patent
Carmel et al.

(10) Patent No.: US 8,805,109 B2
(45) Date of Patent: Aug. 12, 2014

(54) APPARATUS AND METHODS FOR RE-COMPRESSION HAVING A MONOTONIC RELATIONSHIP BETWEEN EXTENT OF COMPRESSION AND QUALITY OF COMPRESSED IMAGE

(75) Inventors: Sharon Carmel, Ramat Hasharon (IL); Dror Gill, Haifa (IL); Tamar Shoham, Netanya (IL)

(73) Assignee: I.C.V.T. Ltd., Tel-Aviv (IL)

( * ) Notice: Subject to any disclaimer, the term of this patent is extended or adjusted under 35 U.S.C. 154(b) by 60 days.

(21) Appl. No.: 13/695,218

(22) PCT Filed: Apr. 14, 2011

(86) PCT No.: PCT/IL2011/000306
§ 371 (c)(1),
(2), (4) Date: Oct. 29, 2012

(87) PCT Pub. No.: WO2011/135558
PCT Pub. Date: Nov. 3, 2011

(65) Prior Publication Data
US 2013/0064466 A1     Mar. 14, 2013

Related U.S. Application Data

(60) Provisional application No. 61/329,217, filed on Apr. 29, 2010, provisional application No. 61/383,750, filed on Sep. 17, 2010, provisional application No. 61/389,828, filed on Oct. 5, 2010.

(30) Foreign Application Priority Data

Oct. 5, 2010   (WO) ................ PCT/1L2010/000809

(51) Int. Cl.
*G06K 9/00*     (2006.01)
*H04N 7/26*     (2006.01)
*H04N 7/30*     (2006.01)

(52) U.S. Cl.
CPC ....... *H04N 19/002* (2013.01); *H04N 19/00357* (2013.01); *H04N 19/00369* (2013.01); *H04N 19/0009* (2013.01); *H04N 19/00472* (2013.01); *H04N 19/00278* (2013.01); *H04N 19/00775* (2013.01)
USPC ........................................... 382/252; 382/251

(58) Field of Classification Search
USPC .................................................. 382/252, 251
See application file for complete search history.

(56) References Cited

U.S. PATENT DOCUMENTS 5,157,488 A     10/1992  Pennebaker
(Continued)

FOREIGN PATENT DOCUMENTS

WO     WO-2008081461 A2     7/2008

OTHER PUBLICATIONS

S. Cho, Z. Bojkovic, D. Milovanovic, J. Lee and J. Hwang, "image quality evaluation: JPEG2000 versus Intra-only H.264/AVC High Profile", Facta Universitatis Elec. Engerg., vol. 20, No. 1, 71-83 (Apr. 2007).

(Continued)

*Primary Examiner* — Yon Couso
(74) *Attorney, Agent, or Firm* — Harness, Dickey & Pierce, PLC

(57) ABSTRACT

A computerized method for independent disjoint block-level recompression of a first image generated by independent coding of disjoint blocks in a precursor image, the first image having at least one first quantization matrix associated therewith, the method comprising performing at least one independent disjoint block-level compression operation, using a processor on the first image, thereby to generate a re-compressed second image including generating a new quantization matrix and using the new quantization matrix for the independent disjoint block-level compression, including computing a rounding error created by the quantization process utilizing the new quantization matrix and, if needed, adjusting at least one value of the new quantization matrix to reduce a rounding error created by the quantization process utilizing the new quantization matrix.

24 Claims, 18 Drawing Sheets

(56) References Cited

U.S. PATENT DOCUMENTS

| | | | |
|---|---|---|---|
| 5,246,512 | A | 9/1993 | Seki et al. |
| 5,629,780 | A | 5/1997 | Watson |
| 5,734,755 | A | 3/1998 | Ramchandran et al. |
| 5,739,457 | A | 4/1998 | Devecka |
| 6,018,121 | A | 1/2000 | Devecka |
| 6,225,547 | B1 | 5/2001 | Toyama et al. |
| 6,233,359 | B1 | 5/2001 | Ratnakar et al. |
| 6,252,994 | B1 | 6/2001 | Nafarieh |
| 6,347,998 | B1 | 2/2002 | Yoshitomi et al. |
| 6,369,313 | B2 | 4/2002 | Devecka |
| 6,390,923 | B1 | 5/2002 | Yoshitomi et al. |
| 6,425,822 | B1 | 7/2002 | Hayashida et al. |
| 6,614,942 | B1 | 9/2003 | Meier |
| 6,645,067 | B1 | 11/2003 | Okita et al. |
| 6,835,887 | B2 | 12/2004 | Devecka |
| 6,850,650 | B1 | 2/2005 | Bauschke et al. |
| 6,982,762 | B1 | 1/2006 | Hui |
| 7,092,578 | B2 | 8/2006 | Kakarala et al. |
| 7,430,330 | B2 | 9/2008 | Hamilton |
| 7,580,579 | B2 | 8/2009 | Wang et al. |
| 2001/0019630 | A1 | 9/2001 | Johnson |
| 2003/0035586 | A1 | 2/2003 | Chou et al. |
| 2005/0175093 | A1 | 8/2005 | Haskell et al. |
| 2006/0023958 | A1 | 2/2006 | Malvar |
| 2007/0248276 | A1 | 10/2007 | Yahata et al. |
| 2007/0279265 | A1 | 12/2007 | Cai et al. |
| 2009/0201316 | A1 | 8/2009 | Bhatt et al. |
| 2009/0204894 | A1 | 8/2009 | Bhatt et al. |
| 2009/0204895 | A1 | 8/2009 | Bhatt et al. |

OTHER PUBLICATIONS

F. De Simone, M. Ouaret, F. Dufaux, A.G. Tescher, and T. Ebrahimi, "A comparative study of JPEG 2000, AVC/H.264, and HD Photo", Applications of Digital Image Processing XXX, Proceedings of SPIE, vol. 6696, San Diego, CA USA, Aug. 28-30, 2007.

Ismail Dalgic, Fouad A. Tobagi, "Constant Quality Video Encoding", Proc. of IEEE ICC'95, Seattle, Washington, Jun. 1995.

I.Matsuda, Y. Nomoto, K. Wakabayashi and S. Itoh, "Lossless Re-encoding of JPEG Images Using Block- Adaptive Intra Prediction" Proc. of 16th European Signal Processing Conference (EUSIPCO 2008), Lausanne, Switzerland, L3-6, Aug. 25-29, 2008.

Anthony J Maeder, Birgit M Planitz, "Medical Image Watermarking forMultiple Modalities," aipr, pp. 158-165, 34th Applied Imagery and Pattern Recognition Workshop (AIPR'05), 2005.

Z.Wang, A.C.Bovik, H.R.Sheikh, E.P. Simoncelli, "Image Quality Assessment: From Error Visibility to Structural Similarity", IEEE Transactions on Image Processing, vol. 13, No. 4, pp. 600-612, Apr. 2004.

M. Martinez-Rach, O. Lopez, P. Pinol, M.P. Malumbres and J. Oliver, "A Study of Objective Quality Assessment Metrics for Video Codec Design and Evaluation", IEEE International Symposium on Multimedia, pp. 517-524, Dec. 2006 (ISM'06).

A.Ouled Zaid, A. Makhloufi, A. Bouallegue, C. Oliver, "JP3D compressed- domain watermaking of still and volumetric medical images", Signal, Image and Video Processing, vol. 4, No. 1, 11-21 (2010).

A. Basso, I. Dalgic, Fouad A. Tobagi and C. J. Van den Branden Lambrecht, "Feedback-control scheme for low-latency constant-quality MPEG-2 video encoding", Proc. SPIE 2952, 460 (1996); doi: 10.1117/12.251307 (Sep. 1998).

http://web.arcive.Org/web/20090228194214/littp://infima-compression.com/images (Sep. 16, 2009).

http://my.smitlimicro.com/stuffitcompression/imagecompression.html (Sep. 16, 2009).

http://www.winsoftmagic.com/aic_features.html (Sep. 16, 2009).

Ramos, M. de Queiroz, R.L., "Adaptive rate-distortion-based thresholding: application in JPEG compression of mixed images for printing", Acoustics, Speech and Signal Processing, 1999, vol. 5.

Kannan Ramchandran and Martin Vetterli, "Rate-Distortion Optimal Fast Thresholing with comlete JPEG/MPEG Decoder compatability", IEEE Transactions on Image Processing, vol. 3, No. 5 (Sep. 1994).

Takeo Omori, Kazuhiko Fukazawa et al., "Novel Inspection Technology for Half Pitch 55 nm and Below," SPIE vol. 5752, pp. 174-182, 2005.

Ruth Rosenholtz & Andrew B. Watson, "Perceptual adaptive JPEG coding", IEEE International Conference on Image Processing, Lausanne, Switzerland, vol. 1, pp. 901-904, 1996.

Andrew B. Watson, "Perceptual optimization of DCT color quantization matrices", Proceedings of IEEE International Conference on Image Processing, Austin, TX, IEEE Computer Society Press, pp. 100-104, (1994).

Andrew B. Watson, "DCTune: A Technique for visual optimization of DCT quantization matrices for individual images", Society for Information Display Digest of Technical Papers XXIV, 946-949, (1993).

Andrew B. Watson, "DCT quantization matrices visually optimized for individual images",Proceedings of Human Vision, Visual Processing, and Digital Display IV, Bellingham, WA, SPIE, pp. 202-216, (1993).

Andrew B. Watson, "Visually optimal DCT quantization matrices for individual images", Data Compression Conference, 1993. DCC '93. Mar. 30-Apr. 2, 1993 pp. 178-187, (1993).

Albert J. Ahumada Jr. & Heidi A. Peterson, "Luminance-model-based DCT quantization for color image compression ", SPIE Proceedings, pp. 365-374, 1992.

Albert J. Ahumada Jr., "Computational image quality metrics: A review", Society for Information Display International Symposium Digest of Technical Papers, ed. J. Morreale, vol. 24, pp. 305-308. Santa Ana, CA, 1993.

H.R.Sheikh, A.C. Bovik, "Image information and visual quality", IEEE Transactions on Image Processing, vol. 15, No. 2, pp. 430-444, Feb. 2006.

Ora Gendler and Moshe Porat,"Toward optimal real-time transcoding using requantization in the DCT domain", 6th IEEE International Conference on Image Processing, (ICIP), pp. 3677-3680 ,Nov. 7-10, 2009.

Ora Gendler and Moshe Porat,"On efficient quantization for image recompression", 17th European Signal Processing Conference, Glasgow, Scotland, Aug. 24-28, 2009.

Heinz H. Bauschke, Christopher H. Hamilton, Mason S. Macklem, Justin S. McMichael, and Nicholas R. Swart, "Recompression of JPEG Images by Requantization", IEEE transactions on Image Processing, vol. 12 (7), pp. 843-849, Jul. 2003.

T. Richter, "On the mDCT-PSNR image quality index", International Workshop on Quality of Multimedia Experience (QoMEX) 2009, pp. 53-58, Germany, Jul. 2009.

Z. Wang, E.P. Simoncelli and A.C. Bovik, "Multi-scale structural similarity for image quality assessment", Proc. 37th IEEE Asilomar conference on Signals, Systems and Computers, pp. 1398-1402, New-York, USA, Nov. 2003.

W. Lin, C.-C. Jay Kuo, "Perceptual visual quality metrics: A survey", J. Visual Communications (2011), doi:10.1016/j.jvcir.2011.01.005.

George A. Triantafyllidis, "Image quality measurement in the frequency domain",4th International Symposiumon on Communications, Control and Signal Processing (ISCCSP), 2010, pp. 1-4, Greece, Mar. 2010.

M. Crouse and K. Ramchandran, "Joint thresholding and quantizer selection for transform image coding: entropy-constrained analysis and applications to baseline JPEG", IEEE transaction on Image Processing, vol. 6., Issue 2, pp. 285-297, Feb. 1997.

R. Kakarala, R. Bagadi, "A method for signalling block-adaptive quantization in baseline sequential JPEG",' Proceedings of IEEE Tencon, Singapore, 2009.

Adriaan Barri, Ann Dooms, Peter Schelkens , "Combining the Best of Perceptual Quality Metrics", Proceedings of the Sixth International Workshop on Video Processing and Quality Metrics (VPQM), 2012.

Nikolay Ponomarenko, Alexander Zemlyachenko,Vladimir Lukin, Karen Egiazarian and Jaakko Astola, "Performance Analysis of Visually Lossless Image Compression", Proceedings of the Sixth International Workshop on Video Processing and Quality Metrics (VPQM), 2012.

(56) References Cited

OTHER PUBLICATIONS

Paolo Gastaldoa and Judith A. Redib,"Machine Learning Solutions for Objective Visual Quality Assessment", Proceedings of the Sixth International Workshop on Video Processing and Quality Metrics (VPQM), 2012.

Ricky D. Nguyen, "Rate Control and Bit Allocation for JPEG Transcoding", Master of Engineering Thesis at MIT, May 2007.

Track Duy Tran, "A Locally Adaptive Perceptual Masking Threshold Model for Image Coding", Master of Science Thesis at MIT, May 1994.

Michael P. Eckert and Andrew P. Bradley, "Perceptual quality metrics applied to still image compression", Journal of Signal Processing—Special issue on image and video quality metrics, vol. 70 Issue 3, Nov. 1998, pp. 177-200.

http://www.facebook.com/note.php?note_it=76191543919 (Sep. 30, 2009).

Fig. 1

10: input JPEG image
↓
20: provide quantization matrix to use for recompression
↓
30: perform monotony fix for quantization matrix provided in step 20 such that monotonized quantization matrix will provide compressed images whose quality is proportional to the extent of compression
↓
40: compress the input JPEG image with monotonized quantization matrix generated in step 30
↓
50: output compressed JPEG image

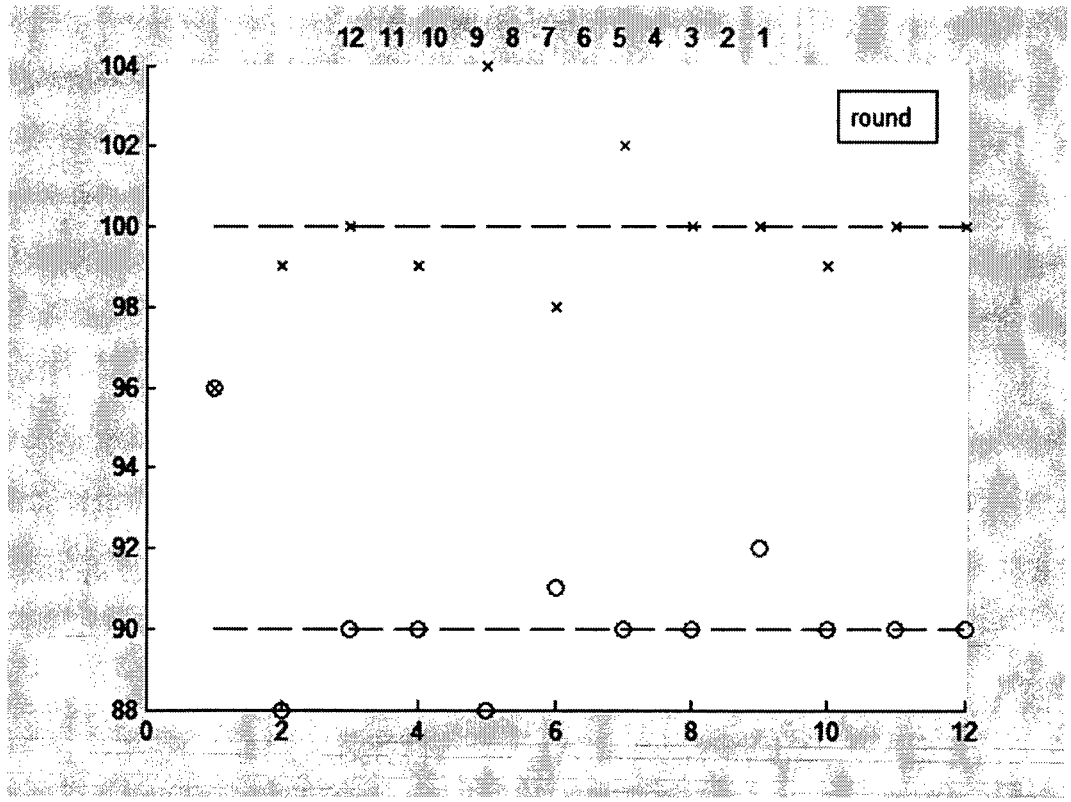

Fig. 2A

| MQF | 64 | 66 | 68 | 70 | 72 | 74 | 76 | 78 | 80 | 82 | 84 |
|---|---|---|---|---|---|---|---|---|---|---|---|
| qual | 0.45 | 0.46 | 0.46 | 0.26 | 0.21 | 0.23 | 0.30 | 0.35 | 0.42 | 0.50 | 0.55 |

Fig. 2B

| 1 | 1 | 1 | 1 | 1 | 2 | 3 | 4 |
|---|---|---|---|---|---|---|---|
| 1 | 1 | 1 | 1 | 2 | 3 | 4 | 3 |
| 1 | 1 | 1 | 1 | 2 | 3 | 4 | 3 |
| 1 | 1 | 1 | 2 | 3 | 5 | 5 | 4 |
| 1 | 1 | 2 | 3 | 4 | 7 | 6 | 5 |
| 1 | 2 | 3 | 4 | 5 | 6 | 7 | 6 |
| 3 | 4 | 5 | 5 | 6 | 7 | 7 | 6 |
| 4 | 6 | 6 | 6 | 7 | 6 | 6 | 6 |

Fig. 2C

| 3 | 2 | 2 | 3 | 5 | 8 | 10 | 12 |
|---|---|---|---|---|---|---|---|
| 2 | 2 | 3 | 4 | 5 | 12 | 12 | 11 |
| 3 | 3 | 3 | 5 | 8 | 11 | 14 | 11 |
| 3 | 3 | 4 | 6 | 10 | 17 | 16 | 12 |
| 4 | 4 | 7 | 11 | 14 | 22 | 21 | 15 |
| 5 | 7 | 11 | 13 | 16 | 21 | 23 | 18 |
| 10 | 13 | 16 | 17 | 21 | 24 | 24 | 20 |
| 14 | 18 | 19 | 20 | 22 | 20 | 21 | 20 |

```
for i=1:8
   for j=1:8
      finished=0;
      while(finished==0)
         Qr=inQM(i,j)/outQM(i,j);
         if((Qr-round(Qr))<-0.1)
            outQM(i,j)=outQM(i,j)-1;
         else
            finished=1;
         end
      end
   end
end
```

Fig. 5A 510. provide a first image compressed using a known first quantization matrix

520. provide a candidate second quantization matrix e.g. using an iterative process including computation of a modified quality factor, using this MQF to generate a quantization matrix. For example, e.g. as per fig. 12, two matrices may be combined, including the first quantization matrix used to compress the input JPEG image and a second matrix such as a default JPEG matrix or such as a matrix suited to the image being compressed. The MQF is used to compute a scaling factor, the second matrix is scaled, and a weighted average of the resulting scaled matrix and the first matrix is computed

530. in candidate 2$^{nd}$ matrix, search for "problematic" values which fall between 1 X corresponding value in the 1$^{st}$ matrix, and 2 X corresponding value in the 1$^{st}$ matrix. Replace each problematic value with corresponding value in the 1$^{st}$ matrix, thereby to obtain a final 2$^{nd}$ quantization matrix

540. use the final 2$^{nd}$ quantization matrix to compress the 1$^{st}$ image

Fig. 5B

550: provide a first image compressed using a known first quantization matrix

560: provide a candidate second quantization matrix e.g. as per figs. 12

570: for each element in candidate second quantization matrix:

580: estimate rounding error which can be expected given relationship between first and candidate second matrices, e.g. using method of Fig. 5C

590: If rounding error is too far from zero e.g. too negative e.g. less than -0.1, add/subtract one from current $2^{nd}$ matrix element and return to step 580

600: once one's have been added/subtracted to all elements in $2^{nd}$ matrix sufficiently to ensure satisfactory estimated rounding error for all elements in candidate $2^{nd}$ q matrix, use this modified candidate second quantization matrix to recompress first image Fig. 5C
610: Compute 'rounding error': compute Qr=Qv_input/Qv_proposed;
620: Compute: Er=Qr-round(Qr)
630: for each of the 64 elements, while Er<-0.1 : (Er will not be smaller than -0.5 because of how it is created), compute: Qv_proposed=Qv_proposed-1 (or +1) then repeat unless it is no longer true that Er<-0.1

Fig. 7

710. Compute Q matrix according to proposed MQF, e.g. as per Fig. 12.

720. For each of the 64 q values in Q, compute the rounding error using the proposed q value and the corresponding q value from the quantization matrix in the original image.

730. For any q value whose rounding error is below a given threshold, increase or decrease its value by 1 repeatedly, until the rounding error exceeds the threshold.

740. When the rounding error exceeds the threshold, use the resulting q value.

Fig. 8

| 1 | 1 | 1 | 1 | 3 | 5 | 7 | 4 |
|---|---|---|---|---|---|---|---|
| 1 | 1 | 1 | 1 | 2 | 7 | 4 | 7 |
| 1 | 1 | 1 | 3 | 5 | 7 | 9 | 7 |
| 1 | 1 | 3 | 2 | 7 | 11 | 11 | 4 |
| 1 | 3 | 5 | 7 | 9 | 7 | 13 | 5 |
| 3 | 5 | 7 | 4 | 11 | 13 | 15 | 6 |
| 3 | 4 | 5 | 11 | 13 | 16 | 16 | 13 |
| 9 | 6 | 13 | 13 | 15 | 13 | 13 | 13 |

Fig. 9a

| 1099 | -10 | 10 | -10 | 18 | -4 | -40 | -12 |
|---|---|---|---|---|---|---|---|
| -249 | 19 | 4 | 13 | -5 | 30 | -6 | -18 |
| 12 | 2 | -19 | -5 | 16 | -22 | -18 | 22 |
| -536 | 1 | -18 | -13 | -12 | 3 | -9 | -22 |
| 8 | -20 | 7 | 10 | -3 | -32 | 20 | -6 |
| 377 | -7 | -4 | -3 | 12 | 0 | 5 | 20 |
| -18 | 15 | -12 | -3 | -12 | -10 | -5 | -12 |
| 60 | -16 | 4 | -12 | -28 | -24 | 4 | -4 |

Fig. 9b

| 3 | 3 | 5 | 5 | 6 | 5 | 6 | 6 |
|---|---|---|---|---|---|---|---|
| 4 | 3 | 3 | 4 | 4 | 5 | 6 | 6 |
| 6 | 3 | 3 | 3 | 5 | 5 | 6 | 7 |
| 5 | 3 | 3 | 3 | 5 | 7 | 7 | 7 |
| 4 | 5 | 3 | 5 | 7 | 8 | 10 | 10 |
| 6 | 4 | 4 | 7 | 6 | 10 | 11 | 10 |
| 6 | 5 | 6 | 7 | 8 | 11 | 11 | 12 |
| 6 | 8 | 7 | 6 | 7 | 8 | 9 | 10 |

Fig. 9c

| 1098 | -9 | 10 | -10 | 18 | -5 | -42 | -12 |
|---|---|---|---|---|---|---|---|
| -248 | 18 | 3 | 12 | -4 | 30 | -6 | -18 |
| 12 | 3 | -18 | -6 | 15 | -20 | -18 | 21 |
| -535 | 0 | -18 | -12 | -10 | 0 | -7 | -21 |
| 8 | -20 | 6 | 10 | 0 | -32 | 20 | -10 |
| 378 | -8 | -4 | 0 | 12 | 0 | 0 | 20 |
| -18 | 15 | -12 | 0 | -16 | -11 | 0 | -12 |
| 60 | -16 | 7 | -12 | -28 | -24 | 0 | 0 |

Fig. 9d

| 1 | 1 | 0 | 0 | 0 | 1 | 2 | 0 |
|---|---|---|---|---|---|---|---|
| 1 | 1 | 1 | 1 | 1 | 0 | 0 | 0 |
| 0 | 1 | 1 | 1 | 1 | 2 | 0 | 1 |
| 1 | 1 | 0 | 1 | 2 | 3 | 2 | 1 |
| 0 | 0 | 1 | 0 | 3 | 0 | 0 | 4 |
| 1 | 1 | 0 | 3 | 0 | 0 | 5 | 0 |
| 0 | 0 | 0 | 3 | 4 | 1 | 5 | 0 |
| 0 | 0 | 3 | 0 | 0 | 0 | 4 | 4 |

Fig. 9e

| 2 | 2 | 3 | 3 | 3 | 3 | 5 | 5 |
|---|---|---|---|---|---|---|---|
| 2 | 2 | 2 | 2 | 2 | 4 | 4 | 4 |
| 2 | 2 | 2 | 2 | 4 | 4 | 5 | 4 |
| 2 | 2 | 2 | 2 | 4 | 6 | 6 | 4 |
| 2 | 2 | 2 | 4 | 6 | 8 | 8 | 7 |
| 2 | 2 | 4 | 6 | 6 | 8 | 10 | 8 |
| 4 | 4 | 6 | 6 | 8 | 10 | 10 | 8 |
| 6 | 6 | 6 | 5 | 6 | 7 | 8 | 8 |

Fig. 9f

| 1100 | -10 | 9 | -9 | 18 | -3 | -40 | -10 |
|---|---|---|---|---|---|---|---|
| -250 | 20 | 4 | 14 | -6 | 32 | -8 | -20 |
| 12 | 2 | -20 | -6 | 16 | -24 | -20 | 24 |
| -536 | 2 | -18 | -14 | -12 | 6 | -12 | -24 |
| 8 | -20 | 8 | 12 | -6 | -32 | 24 | -7 |
| 378 | -8 | -4 | -6 | 12 | 0 | 10 | 24 |
| -20 | 16 | -12 | -6 | -16 | -10 | -10 | -16 |
| 60 | -18 | 6 | -10 | -30 | -21 | 8 | -8 |

Fig. 9g

| 1 | 0 | 1 | 1 | 0 | 1 | 0 | 2 |
|---|---|---|---|---|---|---|---|
| 1 | 1 | 0 | 1 | 1 | 2 | 2 | 2 |
| 0 | 0 | 1 | 1 | 0 | 2 | 2 | 2 |
| 0 | 1 | 0 | 1 | 0 | 3 | 3 | 2 |
| 0 | 0 | 1 | 2 | 3 | 0 | 4 | 1 |
| 1 | 1 | 0 | 3 | 0 | 0 | 5 | 4 |
| 2 | 1 | 0 | 3 | 4 | 0 | 5 | 4 |
| 0 | 2 | 2 | 2 | 2 | 3 | 4 | 4 |

Fig. 10A:

| 1 | 1 | 1 | 1 | 1 | 2 | 3 | 4 |
|---|---|---|---|---|---|---|---|
| 1 | 1 | 1 | 1 | 2 | 3 | 4 | 3 |
| 1 | 1 | 1 | 1 | 2 | 3 | 4 | 3 |
| 1 | 1 | 1 | 2 | 3 | 5 | 5 | 4 |
| 1 | 1 | 2 | 3 | 4 | 7 | 6 | 5 |
| 1 | 2 | 3 | 4 | 5 | 6 | 7 | 6 |
| 3 | 4 | 5 | 5 | 6 | 7 | 7 | 6 |
| 4 | 6 | 6 | 6 | 7 | 6 | 6 | 6 |

Fig. 10B:

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

Fig. 10C:

| | | | | | | | |
|---|---|---|---|---|---|---|---|
| 3.2 | 2.2 | 2 | 3.2 | 4.8 | 8 | 10.2 | 12.2 |
| 2.4 | 2.4 | 2.8 | 3.8 | 5.2 | 11.6 | 12 | 11 |
| 2.8 | 2.6 | 3.2 | 4.8 | 8 | 11.4 | 13.8 | 11.2 |
| 2.8 | 3.4 | 4.4 | 5.8 | 10.2 | 17.4 | 16 | 12.4 |
| 3.6 | 4.4 | 7.4 | 11.2 | 13.6 | 21.8 | 20.6 | 15.4 |
| 4.8 | 7 | 11 | 12.8 | 16.2 | 20.8 | 22.6 | 18.4 |
| 9.8 | 12.8 | 15.6 | 17.4 | 20.6 | 24.2 | 24 | 20.2 |
| 14.4 | 18.4 | 19 | 19.6 | 22.4 | 20 | 20.6 | 19.8 |

Fig. 10D:

| | | | | | | | |
|---|---|---|---|---|---|---|---|
| 2 | 2 | 2 | 2 | 3 | 5 | 7 | 8 |
| 2 | 2 | 2 | 2 | 4 | 7 | 8 | 7 |
| 2 | 2 | 2 | 3 | 5 | 7 | 9 | 7 |
| 2 | 2 | 3 | 4 | 7 | 11 | 11 | 8 |
| 2 | 3 | 5 | 7 | 9 | 14 | 13 | 10 |
| 3 | 5 | 7 | 8 | 11 | 13 | 15 | 12 |
| 6 | 8 | 10 | 11 | 13 | 16 | 16 | 13 |
| 9 | 12 | 13 | 13 | 15 | 13 | 13 | 13 |

Fig. 10E:

| | | | | | | | |
|---|---|---|---|---|---|---|---|
| 1 | 1 | 1 | 1 | 3 | 5 | 7 | 4 |
| 1 | 1 | 1 | 1 | 2 | 7 | 4 | 7 |
| 1 | 1 | 1 | 3 | 5 | 7 | 9 | 7 |
| 1 | 1 | 3 | 2 | 7 | 11 | 11 | 4 |
| 1 | 3 | 5 | 7 | 9 | 7 | 13 | 5 |
| 3 | 5 | 7 | 4 | 11 | 13 | 15 | 6 |
| 3 | 4 | 5 | 11 | 13 | 16 | 16 | 13 |
| 9 | 6 | 13 | 13 | 15 | 13 | 13 | 13 |

Fig. 11A

810: performing at least one independent disjoint block-level compression operation, using a processor, on the first image thereby to generate a re-compressed second image including generating a new quantization matrix

↓

820: using said new quantization matrix for said independent disjoint block-level compression, including performing the method of Fig. 11B for at least one of and typically all of the (row, column) positions in the matrices

Fig. 11B:

830: computing a rounding error created by the quantization process utilizing the new quantization matrix

↓

840: if the rounding error fulfils an unacceptability criterion e.g. the rounding error being more negative than a threshold acceptable rounding value such as but not limited to -0.1, adjusting at least one values of said new quantization matrix to reduce the rounding error created by the quantization process utilizing said new quantization matrix.

Fig. 12

910: $QO_{ij}$ (i,j = 1..8) is the quantization matrix of the original image.

$QD_{ij}$ (i,j = 1..8) is a second quantization matrix, for example the default quantization matrix described in the JPEG standard, an optimal JPEG quantization matrix computed for the image, the quantization matrix of the original image, or any other second quantization matrix selected for encoding the image.

MQF is the Modified Quality Factor used in the current iteration of recompression.

$\downarrow$

915: Compute S, the scaling parameter used to scale the second t quantization matrix $QD_{ij}$ as follows:.

IF MQF<50 S=(5000/MQF)/100 ELSE S=(200-2*MQF)/100.

$\downarrow$

920: compute scaled quantization matrix $QS_{ij}$ (i,j = 1..8) as follows: $QS_{ij}$ = S * $QD_{ij}$ (i,j = 1..8)

$\downarrow$

930: generate temporary quantization matrix of the reconstructed image $QT_{ij}$ (i,j = 1..8) as follows:

$QT_{ij}$ = $W_{ij}$ * $QS_{ij}$ + (1- $W_{ij}$) * $QO_{ij}$ (i,j = 1..8) where $W_{ij}$ (i,j = 1..8) is a weighting matrix, with values between 0 and 1.

$\downarrow$

940: generate quantization matrix of the reconstructed image $QR_{ij}$ (i,j = 1..8) as follows:

if $QT_{ij}$ >= $QO_{ij}$, then $QR_{ij}$ = $QT_{ij}$ , otherwise, $QR_{ij}$ = $QO_{ij}$

APPARATUS AND METHODS FOR RE-COMPRESSION HAVING A MONOTONIC RELATIONSHIP BETWEEN EXTENT OF COMPRESSION AND QUALITY OF COMPRESSED IMAGE

REFERENCE TO CO-PENDING APPLICATIONS

Priority is claimed from U.S. Provisional Application No. 61/329,217, filed 29 Apr. 2010 entitled "Recompression Of Digital Images Using A Robust Measure Of Perceptual Quality Including Improved Quantization Matrix Computation"; from U.S. Provisional Application No. 61/383,750, filed 17 Sep. 2010 entitled "Recompression Of Digital Images"; from U.S. Provisional Application No. 61/389,828, filed 5 Oct. 2010 entitle "Apparatus And Methods For Re-Compression Having A Monotonic Relationship Between Extent Of Compression And Quality Of Compressed Image"; and from PCT applicaion No. IL2010/000809 filed 5 Oct. 2010, entitled "Apparatus And Methods For Recompression Of Digital Images".

FIELD OF THE INVENTION

The present invention relates generally to compression of digital images and more particularly to re-compression of digital images.

BACKGROUND OF THE INVENTION

Re-compression of digital images such as jpeg images is well known.

It is desirable to have a monotonic relationship between the extent of compression and the quality of the compressed image.

SUMMARY OF THE INVENTION

Certain embodiments of the present invention seek to provide recompression of images which provides monotony of compressed image quality as a function of extent of compression e.g. by recognizing quantizer values that may cause increased quantization error and avoiding them.

Certain embodiments of the present invention seek to provide a re-compression system comprising apparatus for providing a selected degree of compression; and apparatus for compressing images in accordance with the selected degree of compression, including apparatus for deriving a quantization matrix from the selected quality factor such that the quality score of images compressed using the quantization matrix is monotonically related to the selected degree of compression. The degree of compression may be represented by a Quality Factor (QF) measure used to derive a scaling factor for scaling a given quantization matrix as commonly used, for example, in common JPEG image encoders, or by a Modified Quality Factor MQF (MQF), which can be computed by any of the methods shown and described in Applicant's concurrently filed application entitled "Apparatus and Methods for Recompression of Digital Images". The QF or the MQF may be user selected using a suitable user input device such as a GUI, generated by a computer algorithm, or predefined in tables.

There is thus provided, in accordance with an aspect of the present invention, a computerized method for independent disjoint block-level recompression of a first image generated by independent coding of disjoint blocks in a precursor image, the first image having at least one first quantization matrix associated therewith, the method comprising performing at least one independent disjoint block-level compression operation, using a processor, on the first image thereby to generate a re-compressed second image including generating a new quantization matrix and using the new quantization matrix for the independent disjoint block-level compression, including computing a rounding error created by the quantization process utilizing the new quantization matrix.

In accordance with an embodiment of the invention, there is provided a method wherein the new quantization matrix is generated by scaling at least one second quantization matrix by at least one scaling factor, thereby to provide at least one scaled matrix, and subsequently computing at least one additional quantization matrix as a weighted average of said at least one scaled matrix with the at least one first quantization matrix.

In accordance with an embodiment of the invention, there is further provided a method wherein the at least one value of the new quantization matrix is adjusted to minimize said rounding error.

In accordance with an embodiment of the invention, there is still further provided a method wherein the at least one value of the new quantization matrix is adjusted to minimize the rounding error.

In accordance with an embodiment of the invention, there is still further provided a method comprising transmitting the re-compressed second image to a remote receiver.

In accordance with an embodiment of the invention, there is still further provided a method wherein the adjusting comprises computing a quantization matrix according to a proposed compression level; for each quantization value in the quantization matrix, computing a rounding error using a proposed quantization value and a corresponding quantization value from the quantization matrix in the original image; for any quantization value whose rounding error is below a given threshold, modify its value by 1 repeatedly, in a given direction, until the rounding error exceeds a predetermined threshold; and when the rounding error exceeds the threshold, use the resulting quantization value.

In accordance with an embodiment of the invention, there is still further provided a method comprising providing a first quantization matrix comprising a JPEG standard matrix.

In accordance with an aspect of the invention, there is provided a computerized system for independent disjoint block-level recompression of a first image generated by independent coding of disjoint blocks in a precursor image, the first image having at least one first quantization matrix associated therewith, the system comprising a disjoint rounding error-reducing block-level compressor operative for performing at least one independent disjoint block-level compression operation on the first image thereby to generate a re-compressed second image including generating a new quantization matrix and using the new quantization matrix for the independent disjoint block-level compression, including computing a rounding error for at least one entry in new quantization matrix and if required adjusting the value of the new quantization matrix to reduce a rounding error created by the quantization process utilizing the new quantization matrix.

In accordance with an aspect of the invention, there is further provided a computerized compression method comprising providing a first image compressed using a known first quantization matrix; providing a candidate second quantization matrix; modifying said candidate quantization matrix, using a processor, such that the modified quantization matrix will provide compressed images whose quality is proportional to the extent of compression; and using the final $2^{nd}$ quantization matrix to compress the $1^{st}$ image.

In accordance with an embodiment of the invention, there is still further provided a method wherein the modifying comprises using a candidate-for-final $2^{nd}$ quantization matrix to evaluate a rounding error between itself and the known $1^{st}$ quantization matrix, searching for problematic values which fall between 1× corresponding value in the $1^{st}$ matrix, and 2× corresponding value in the $1^{st}$ matrix, and replacing each problematic value found in said searching, with a corresponding value in the $1^{st}$ matrix, thereby to obtain said final $2^{nd}$ quantization matrix.

In accordance with an embodiment of the invention, there is still further provided a method wherein said modifying comprises providing a candidate second quantization matrix; for each individual element in candidate second quantization matrix, estimating the rounding error which can be expected given the relationship between the first and candidate second matrices and, while the rounding error is too far from zero, repeatedly change, by one, the individual $2^{nd}$ matrix element, thereby to obtain the final $2^{nd}$ quantization matrix.

In accordance with an embodiment of the invention, there is still further provided a method wherein the independent disjoint block-level recompression comprises JPEG recompression.

In accordance with an embodiment of the invention, there is still further provided a method wherein the computing a rounding error comprises computing a difference between a ratio of corresponding quantizer entries in the quantization matrices and the ratio's rounded value.

In accordance with an embodiment of the invention, there is still further provided a method wherein the rounding error comprises an error resulting from rounding a ratio of two corresponding quantizer values in the quantization matrices.

In accordance with an aspect of the invention, there is still further provided a computerized re-compression system comprising apparatus for providing a selected degree of compression; and apparatus for using a processor to compress images in accordance with the selected degree of compression, including apparatus for deriving a quantization matrix from the selected quality factor such that the quality score of images compressed using the quantization matrix is monotonically related to the selected degree of compression.

In accordance with an embodiment of the invention, there is yet further provided a system wherein the degree of compression is represented by a QF measure.

In accordance with an embodiment of the invention, there is still further provided a system wherein the degree of compression is represented by an MQF.

In accordance with an aspect of the invention, there is still further provided a computerized re-compression system comprising apparatus for modifying a candidate quantization matrix to accommodate a known first quantization matrix used to compress at least one first image thereby to generate a modified quantization matrix which will provide at least one re-compressed image, re-compressed from a compressed at least one first image, wherein the quality of the at least one re-compressed image is proportional to the extent of re-compression of the re-compressed image relative to the compressed first image; and
apparatus for employing a processor which uses the modified quantization matrix to re-compress at least the compressed first image.

In accordance with an aspect of the invention, there is still further provided a computerized re-compression method comprising providing a selected degree of compression; and compressing images in accordance with the selected degree of compression, using a processor, including deriving a quantization matrix from the selected quality factor such that the quality score of images compressed using the quantization matrix is monotonically related to the selected degree of compression, and using the quantization matrix to compress the images.

In accordance with an embodiment of the invention, there is still further provided a method comprising determining whether or not to adjust at least one value of the new quantization matrix to reduce a rounding error created by the quantization process utilizing the new quantization matrix and, if so, adjusting at least one value of the new quantization matrix to reduce a rounding error created by the quantization process utilizing the new quantization matrix.

In accordance with an embodiment of the invention, there is still further provided a method wherein the compression level is selected by a user using at least one of an MQF and a QF value.

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory, such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. Some or all of the steps described herein may employ a computer processor, inter alia.

BRIEF DESCRIPTION OF THE DRAWINGS

Certain embodiments of the present invention are illustrated in the following drawings:

FIG. 1 is a simplified flowchart illustration of a re-compression method constructed and operative in accordance with certain embodiments of the present invention.

FIGS. 2A-2D are a graph and tables useful in understanding certain aspects of the re-compression methods shown and described herein.

FIG. 4 is a computer coded loop which is useful in conjunction with a quantization matrix computation functionality, according to certain embodiments of the present invention.

FIG. 5A is a simplified flowchart illustration of a method for recompression constructed and operative in accordance with one embodiment of the present invention.

FIG. 5B is a simplified flowchart illustration of a method for recompression constructed and operative in accordance with another embodiment of the present invention.

FIG. 5C is a simplified flowchart illustration of a method for performing the rounding error estimation step of FIG. 5B.

FIG. 7 is a simplified flowchart illustration of a method for disabling problematic quantizer values, according to some embodiments of the present invention.

FIG. 8 is a table representing a final quantization matrix after applying a monotony increasing functionality e.g. as shown and described herein.

FIGS. 9A-9g are tables useful in understanding the problem of increase in rounding error despite finer quantization which is partially or wholly overcome by certain embodiments of the present invention.

FIG. 9a is a table representing original DCT coefficients after inverse quantization FIG. 9b is a table representing a first quantization matrix.

FIG. 9c is a table representing resulting DCT coefficients after quantization with the matrix of FIG. 9b and inverse quantization.

FIG. 9d is a table representing absolute error between the values in FIG. 9c and the values in FIG. 9a.

FIG. 9e is a table representing a second quantization matrix.

FIG. 9f is a table representing resulting DCT coefficients after quantization with the matrix of FIG. 9e and inverse quantization.

FIG. 9g is a table representing absolute error between the values in FIG. 9f and the values in FIG. 9a.

FIGS. 10A-10E are tables useful in understanding a quantization matrix computation process operative in accordance with certain embodiments of the present invention.

FIGS. 11A and 11B, taken together, form a simplified flowchart illustration of a computerized method for independent disjoint block-level recompression of a first image generated by independent coding of disjoint blocks in a precursor image, the first image having at least one first quantization matrix associated therewith, the method comprising some or all of the illustrated steps suitably ordered e.g. as follows:

FIG. 12 is a simplified flowchart illustration of a method for generating a new quantization matrix, in accordance with certain embodiments of the present invention.

DETAILED DESCRIPTION OF CERTAIN EMBODIMENTS

Figure 3A:
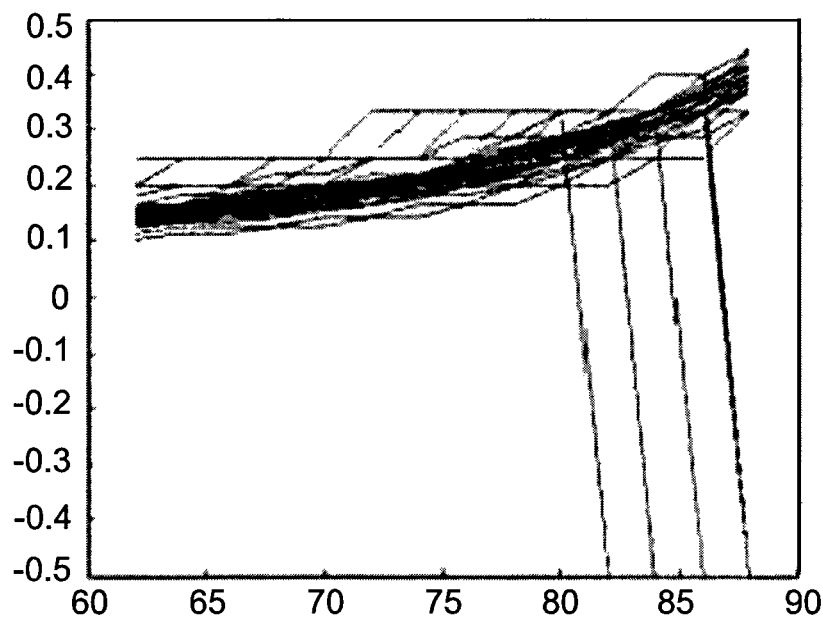
FIGS. 3A and 3B are graphs of the rounding error and the absolute rounding error obtained with the Q matrix shown in FIG. 2C for each of the 64 Q matrix values, as a function of the MQF.
Figure 3B:
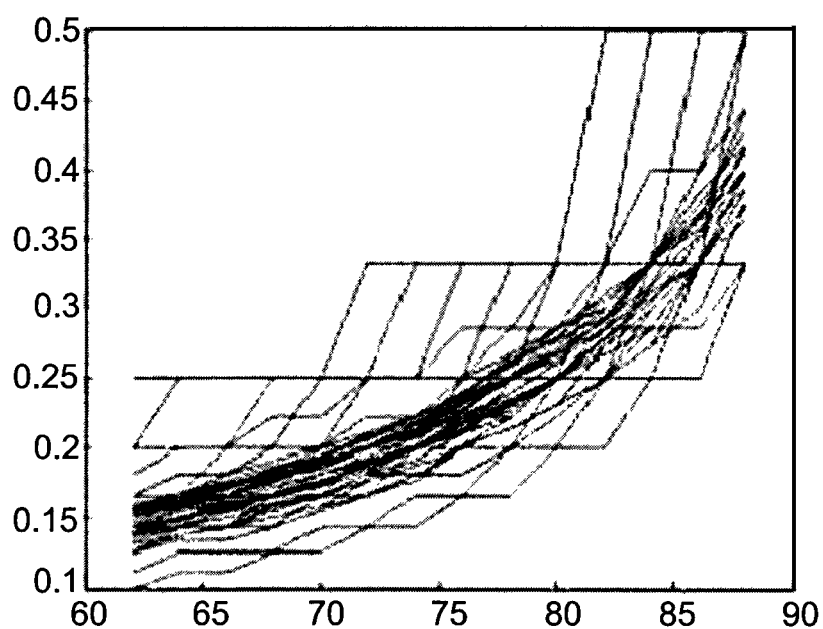
Figure 3C:
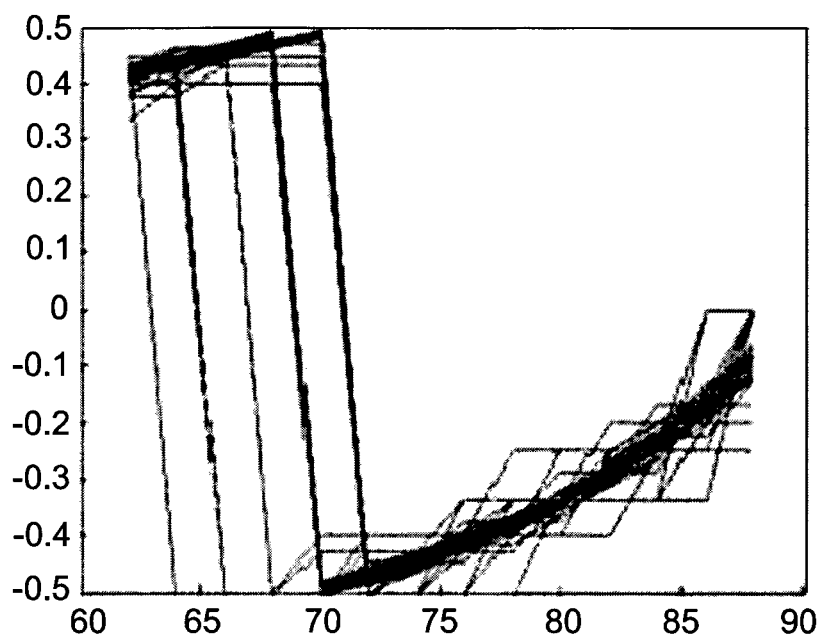
FIGS. 3C-3D are graphs of the rounding error and the absolute rounding error obtained with the Q matrix shown in FIG. 2C for each of the 64 Q matrix values, as a function of the MQF.
Figure 3D:
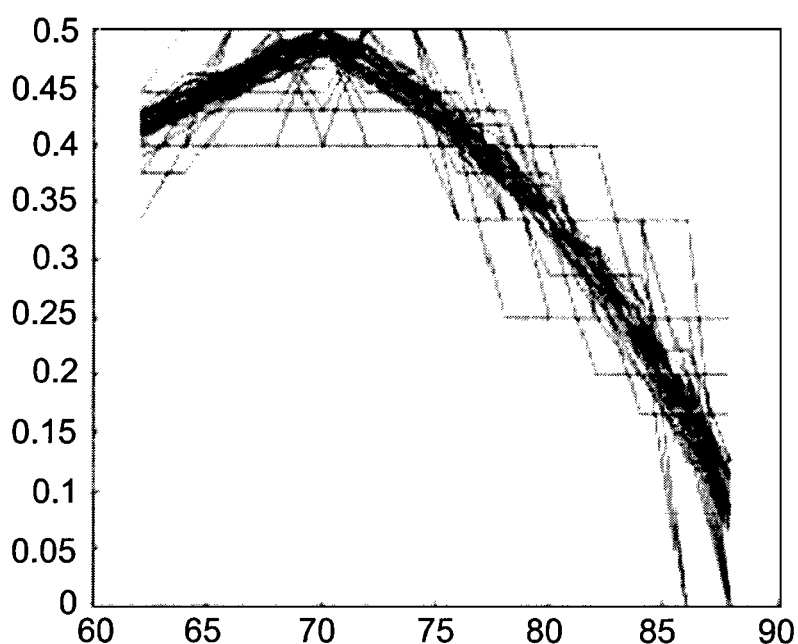

The following re-compression method, as illustrated in FIG. 1, is provided in accordance with certain embodiments. The method of FIG. 1 includes some or all of the following steps, suitably ordered e.g. as shown:

Step 10: input JPEG image

Step 20: provide quantization matrix to use for recompression

Step 30: perform monotony increasing process for quantization matrix provided in step 20 such that monotonized quantization matrix will provide compressed images whose quality is proportional to the extent of compression Step 40: compress the input JPEG image with monotonized quantization matrix generated in step 30

Step 50: output compressed JPEG image

Generally, quality scores e.g. PSNR are not monotonous with the amount of compression applied in a conventional JPEG coder. For example, in subjective evaluations on occasion the quality decreases when the amount of compression is decreased.

For example, one image was found to yield the following perceptual quality score (qualS) vs. MQF: MQF: 70 qualS: 0.4069

MQF: 80 qualS: 0.38005

MQF: 88 qualS: 0.058504

MQF: 92 qualS: 0.86324

MQF: 90 qualS: 0.1638

MQF: 91 qualS: 0.79987

The graph of FIG. 2A shows the actual value obtained when quantizing values 100 (x) and 90 (o) when varying the quantizer value (i.e. quantization matrix element value) from 12 down to 1. Despite the finer quantization, the error often increases. For instance for 100: with Q=10 there is no error whereas for Q=8 there is an error of 4.

According to an embodiment of the present invention, when recompressing an image compressed using a quantization matrix Q1, the quantization matrix Q2 which is used should be such as to avoid the following situation for any of the entries in the matrices:

$$abs(Q1/Q2a - round(Q1/Q2a)) = 0.5.$$

It is believed that what causes the non-monotony i.e. drop in quality is not only the absolute quantization error but also its phase, as demonstrated in FIGS. 3A-3D. It is appreciated that in the case of monotone quality almost all quantization element errors are always positive. Therefore, rather than performing adjustments that bound the absolute error, adjustments may be introduced that 'disable' errors that cause rounding that are lower than a certain threshold.

The loop illustrated in FIG. 4 may be added to the function that calculates a proposed quantization matrix for recompression, after computing and clipping the values as described herein or as is conventional. The operation of FIG. 4 may be performed only once for each of the 64 quantizer values in an 8×8 quantization matrix, per iteration.

FIG. 5A is a simplified flowchart illustration of a method for recompression constructed and operative in accordance with one embodiment of the present invention. The method of FIG. 5A typically includes some or all of the following steps, suitably ordered e.g. as shown:

Step 510. provide a first image compressed using a known first quantization matrix Step 520. provide a candidate second quantization matrix e.g. using an iterative process including computation of a modified quality factor, using this MQF to generate a quantization matrix. For example, e.g. as per FIG. 12, two matrices may be combined, including the first quantization matrix used to compress the input JPEG image and a second matrix such as a default JPEG matrix or such as a matrix suited to the image being compressed. The MQF is used to compute a scaling factor, the second matrix is scaled, and a weighted average of the resulting scaled matrix and the first matrix is computed Step 530. in candidate $2^{nd}$ matrix, search for "problematic" values which fall between 1× corresponding value in the $1^{st}$ matrix, and 2× corresponding value in the $1^{st}$ matrix. Replace each problematic value with corresponding value in the $1^{st}$ matrix, thereby to obtain a final $2^{nd}$ quantization matrix Step 540. use the final $2^{nd}$ quantization matrix to compress the $1^{st}$ image FIG. 5B is a simplified flowchart illustration of a method for recompression constructed and operative in accordance with another embodiment of the present invention. The method of FIG. 5B typically includes some or all of the following steps, suitably ordered e.g. as shown:

Step 550: provide a first image compressed using a known first quantization matrix Step 560: provide a candidate second quantization matrix e.g. as per FIG. 12

Step 570: for each element in candidate second quantization matrix:

Step 580: estimate rounding error which can be expected given relationship between first and candidate second matrices, e.g. using method of FIG. 5C Step 590: If rounding error is too far from zero e.g. too negative e.g. less than −0.1, add/subtract one from current $2^{nd}$ matrix element and return to step 580

Step 600: once one's have been added/subtracted to all elements in $2^{nd}$ matrix sufficiently to ensure satisfactory estimated rounding error for all elements in candidate $2^{nd}$ q matrix, use this modified candidate second quantization matrix to recompress first image FIG. 5C is a simplified flowchart illustration of a method for performing the rounding error estimation step of FIG. 5B. The method of FIG. 5C typically includes some or all of the following steps, suitably ordered e.g. as shown:

Step 610: Compute 'rounding error': compute Qr=Qv_input/Qv_proposed;

Step 620: Compute: Er=Qr-round(Qr)

Step 630: for each of the 64 elements, while Er<−0.1: (Er will not be smaller than −0.5 because of how it is created), compute: Qv_proposed=Qv_proposed−1 (or +1) then repeat unless it is no longer true that Er<−0.1

After examining a large number of images which were recompressed using some embodiments of the method proposed herein, it was found that both the quality score and the actual perceived image quality are not monotonous with the MQF, which can extend the search process for the optimal MQF in an iterative, perceptually lossless recompression system.

To demonstrate this effect, let V1 be a decoded, quantized DCT value in the original JPEG, and let Q1 be the corresponding quantizer value in the original JPEG Q matrix. Then, the reconstructed value after inverse quantization is V1*Q1. Let Q2 be the corresponding quantizer value used by the quantization matrix in a recompression process. Then V2, the new quantized DCT value, is given by V2=round(V1*Q1/Q2). This value will then be reconstructed at the decoder as V2*Q2.

Therefore, the error introduced by the requantization process is:

$$Qe=(V1*Q1)-(V2*Q2)=V1*Q1-Q2*\text{round}(V1*Q1/Q2)$$

If the quantization ratio QR is defined to be QR=Q1/Q2, this will result in:

$$Qe=Q2*(V1*QR-\text{round}(V1*QR));$$

This error depends on the specific DCT coefficient values, but assuming the coefficients are randomly distributed, the error is proportional to QR−round(QR), i.e., the further QR is from an integer value, the higher the expected error.

Further evaluations have shown that the main drop in quality occurs when this rounding error [QR−round(QR)], is highly negative. Therefore, adjustments may be introduced that disable new quantizer values for which the rounding error is lower than a certain threshold.

Figure 6A:
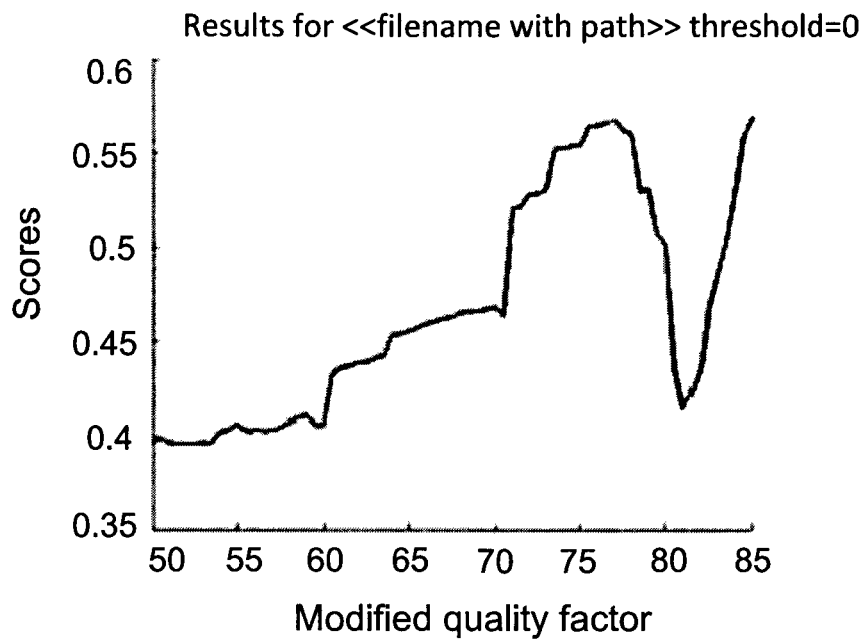
FIG. 6a is a graph of obtained quality scores vs. MQF for an example image without employing the monotony increasing functionality of FIG. 7.
Figure 6B:
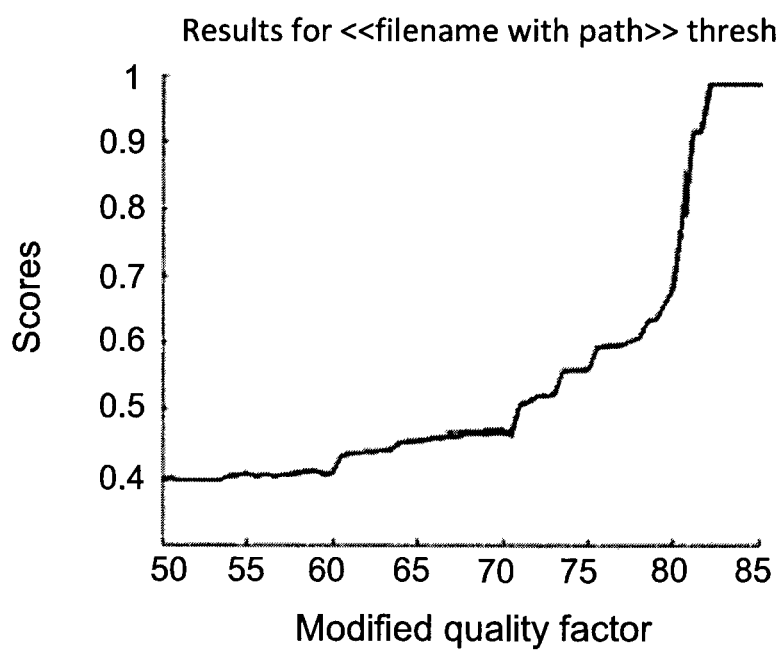
FIG. 6b is a graph of obtained quality scores vs. MQF for an example image which employs the monotony increasing functionality of FIG. 7.

FIGS. 6a and 6b show an example of obtained quality scores vs. MQF for an example image without and with a monotony improving process, respectively. The monotony improving process used for FIG. 6b but not for FIG. 6a, is described in FIG. 7. The method of FIG. 7 typically includes some or all of the following steps, suitably ordered e.g. as shown:

Step 710. Compute Q matrix according to proposed MQF, e.g. as per FIG. 12.

Step 720. For each of the 64 q values in Q, compute the rounding error using the proposed q value and the corresponding q value from the quantization matrix in the original image.

Step 730. For any q value whose rounding error is below a given threshold, increase or decrease its value by 1 repeatedly, until the rounding error exceeds the threshold.

Step 740. When the rounding error exceeds the threshold, use the resulting q value.

The process shown in FIG. 7 has two degrees of freedom: selecting the threshold for an unacceptable rounding error, and correcting the proposed quantization value either by increasing or decreasing its value. It was found that one method of implementing the process shown in FIG. 7 is thresholding, e.g. with a threshold of approximately −0.1, with the quantization value decrease approach.

According to further embodiments, an alternative process may be used with respect to the non-monotony problem including: identifying proposed q values that are equal to double or less the original quantization value, i.e. q_new<=2*q_org, and correcting the quantization value to q_org, or 1.1*q_org. FIGS. 6a and 6b graphically illustrate an example of obtained quality scores vs. MQF for an example image with and without the monotony fix of FIG. 7, respectively.

FIG. 8 shows an example of applying a monotony fix (monotony increasing) method e.g. as shown and described herein, after computing a new quantization matrix. Values affected by the monotony fix are shown in bold. FIGS. 9a-9g show an example of increase in the rounding error despite finer quantization, which demonstrates the importance of ensuring or increasing the monotony of the image quality vs. MQF function e.g. by disabling problematic quantizer values, in accordance with certain embodiments of the present invention.

In particular, FIG. 9a shows the original DCT coefficients of the input image after inverse quantization. FIG. 9b shows an example of a quantization matrix used to compress the input image. FIG. 9c shows the resulting DCT coefficients after quantization with the matrix of FIG. 9b, and inverse quantization. FIG. 9d shows the absolute error between the values in FIG. 9c and the values in FIG. 9a.

FIG. 9e shows an example of a second quantization matrix used to compress the input image, which is finer than the matrix of FIG. 9b, and therefore is expected in theory, although not in practice, to create a higher quality image. FIG. 9f shows the resulting DCT coefficients after quantization with the matrix of FIG. 9e and inverse quantization. FIG. 9g shows the absolute error between the values in FIG. 9f and the values in FIG. 9a.

The mean absolute error between the reconstructed coefficients and the original coefficients using the first quantization matrix e.g. average of the values in FIG. 9d is 1.1. The mean absolute error between the reconstructed coefficients and the original coefficients using the second quantization matrix, which is finer than the first matrix e.g. average of the values in FIG. 9g, is 1.5. In summary, compressing with a finer quantization matrix can result in an image with lower quality hence the usefulness of the monotony providing or increasing methods shown and described herein.

FIGS. 10A-10E are tables illustrating stages of a quantization matrix computation process useful in conjunction with the methods shown and described herein above:

FIG. 10A is an example quantization matrix used to generate an input JPEG image to be re-compressed.

FIG. 10B is a pre-selected quantization matrix.

FIG. 10C is a scaled quantization matrix, using MQF=90=>scf=0.2.

FIG. 10D is the output of an averaging+clipping stage which may be based on the following formula:

$$\text{Max}\{QM\text{input},\text{round}[0.5*(QM1s+QM\text{input})]\}.$$

FIG. 10E is the output of the monotony increasing stage shown and described herein; matrix elements modified in this stage are shown in bold.

FIGS. 11A and 11B, taken together, form a simplified flowchart illustration of a computerized method for independent disjoint block-level recompression of a first image generated by independent coding of disjoint blocks in a precursor image, the first image having at least one first quantization matrix associated therewith, the method comprising some or all of the illustrated steps suitably ordered e.g. as follows:

In FIG. 11A:

Step 810: performing at least one independent disjoint block-level compression operation, using a processor, on the first image thereby to generate a re-compressed second image including generating a new quantization matrix Step 820: using said new quantization matrix for said independent disjoint block-level compression, including performing the method of FIG. 11B for at least one of and typically all of the (row, column) positions in the matrices In FIG. 11B:

Step 830: computing a rounding error created by the quantization process utilizing the new quantization matrix Step 840: if the rounding error fulfils an unacceptability criterion e.g. the rounding error being more negative than a threshold acceptable rounding value such as but not limited to −0.1, adjusting at least one values of said new quantization matrix to reduce the rounding error created by the quantization process utilizing said new quantization matrix.

FIG. 12 is a simplified flowchart illustration of a method for generating a new quantization matrix, in accordance with certain embodiments of the present invention.

The method of FIG. 12 typically includes some or all of the following steps, suitably ordered e.g. as shown:

Step 910: $QO_{ij}$ (i,j=1 . . . 8) is the quantization matrix of the original image.

$QD_{ij}$ (i,j=1 ... 8) is a second quantization matrix, for example the default quantization matrix described in the JPEG standard, an optimal JPEG quantization matrix computed for the image, the quantization matrix of the original image, or any other second quantization matrix selected for encoding the image.

MQF is the Modified Quality Factor used in the current iteration of recompression.

Step 915: Compute S, the scaling parameter used to scale the second t quantization matrix $QD_{ij}$ as follows:

IF MQF<50 S=(5000/MQF)/100 ELSE S=(200−2*MQF)/100.

Step 920: compute scaled quantization matrix $QS_{ij}$ (i,j=1 ... 8) as follows: $QS_{ij}=S*QD_{ij}$ (i,j=1 ... 8)

Step 930: generate temporary quantization matrix of the reconstructed image $QT_{ij}$ (i,j=1 ... 8) as follows:
$QT_{ij}=W_{ij}*QS_{ij}+(1-W_{ij})*QO_{ij}$ (i,j=1 ... 8) where $W_{ij}$ (i,j=1 ... 8) is a weighting matrix, with values between 0 and 1.

Step 940: generate quantization matrix of the reconstructed image $QR_{ij}$ (i,j=1 ... 8) as follows:

if $QT_{ij}>=QO_{ij}$, then $QR_{ij}=QT_{ij}$, otherwise, $QR_{ij}=QO_{ij}$

According to certain embodiments, the quantization matrix is modified only in situations which are likely to cause a high rounding error.

It is appreciated that the monotony improving methods shown and described herein are suitable for implementation inter alia in any system which processes and compresses one or more JPEG images, including decoding and re-encoding the image/s. Typically such a system inputs a JPEG image, decodes it, optionally image processes the decoded image and then encodes to obtain an output JPEG image. Examples of such image processing system are PhotoShop, Windows Image and Fax Viewer, particularly the photograph rotation functionality. The monotony improving methods shown and described herein may be implemented in the JPEG encoder of such systems. The decoding and encoding in the JPEG decoder and encoder respectively may be only partial decoding and encoding, e.g. to the DCT level, rather than full decoding to the pixel level.

Any suitable input device may be used to provide, generate, transmit and/or compress input images for the recompression methods shown and described herein. Any suitable output device or computer display may be used to display images generated by the methods shown and described herein. A computer network may be employed to transmit input images to the recompression systems shown and described herein, or to transmit output images therefrom, to auxiliary computerized systems e.g. using a client-server type relationship between the recipients of output images and providers of input images, on the one hand, and the recompression systems shown herein on the other hand. Any suitable computer processor may be employed to provide any or all of the computational functionalities shown and described herein; any of these, or any combination of these or any suitable portion of these may comprise a module in such a processor. Any suitable form of computerized data storage e.g. computer memory may be employed to store input images to the recompression systems shown and described herein, or output images generated thereby.

The methods and systems shown and described herein may be applicable to formats which are not identical to JPEG but have relevant features in common with JPEG.

The terms "degree of compression" and "compression level" as used herein are generally synonymous, both referring to the extent of reduction in size wrought in the image by (re)compression, this being typically controlled by the magnitude of values in the q matrix, which in turn is normally determined by a user-selected MQF or QF value.

Certain embodiments of the present invention can be implemented in hardware or in software, including implementation in VLSI, in dedicated hardware, in embedded systems with a DSP or CPU (computerized device), or running fully in software on a general purpose computer. Certain embodiments of the present invention are particularly useful in conjunction with or as a module within image recompression systems such as conventional Image recompression and processing systems such as but not limited to software and hardware image encoders, command line PC applications such as ImageMagick and jpegtrans, and any PC imaging software such as PhotoShop, Paint, and Microsoft Office Picture Manager.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable sub-combination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A computerized method for generating a quantization matrix usable for independent disjoint block-level recompression of an image, the image generated by independent disjoint block level compression of a precursor image using at least one first quantization matrix, the method comprising:
   providing a second quantization matrix;
   updating, using a processor, the second quantization matrix to provide a monotonic relationship between a compression extent and a compression quality when performing independent disjoint block-level recompression of the image using the second quantization matrix, including, for at least one (row, column) position, performing the following, giving rise to the quantization matrix:
   calculating a ratio between values located at the position in the first quantization matrix and in the second quantization matrix;
   calculating a rounding of the ratio;
   calculating a rounding error, being a difference between the ratio and the rounding; and
   if the rounding error fulfills an unacceptability criterion, decreasing, using the processor, the value at the position in the second quantization matrix.

2. A method according to claim 1 wherein said providing comprises generating the second quantization matrix by: scaling a third quantization matrix by a scaling factor, thereby to provide a scaled matrix, and subsequently computing a weighted average of said at least one scaled matrix with the first quantization matrix.

3. A method according to claim 1 wherein said providing comprises generating
   the second quantization matrix according to a proposed compression level.

4. A method according to claim 1 wherein the second quantization matrix is a default JPEG matrix.

5. A computerized system for generating a quantization matrix usable for independent disjoint block-level recompression of an image, the image generated by independent disjoint block level compression of a precursor image using at least one first quantization matrix, the system comprising a processor configured to:
   receive a second quantization matrix;
   update the second quantization matrix to provide a monotonic relationship between a compression extent and a compression quality when performing independent disjoint block-level recompression of the image using the second quantization matrix, including, for at least one (row, column) position, performing the following, giving rise to the quantization matrix:
   calculating a ratio between values located at the position in the first quantization matrix and in the second quantization matrix;
   calculating a rounding of the ratio;
   calculating a rounding error, being a difference between the ratio and the rounding; and
   if the rounding error fulfills an unacceptability criterion, decreasing the value at the position in said second quantization matrix.

6. A method according to claim 3 wherein said proposed compression level is selected by a user using at least one of an Modified Quality Factor and a Quality Factor.

7. A method according to claim 1 wherein said unacceptability criterion comprises said rounding error being more negative than a threshold acceptable rounding value.

8. A method according to claim 7 wherein said threshold acceptable rounding value comprises −0.1.

9. A method according to claim 1 wherein said updating is performed for all (row, column) positions in the first quantization matrix and in the second quantization matrix.

10. The method of claim 1 further comprising utilizing the second quantization matrix for recompressing the image while maintaining the monotonic relationship between the compression extent and the compression quality.

11. The method according to claim 10 wherein said recompressing is a JPEG recompression.

12. A method according to claim 2 wherein the third quantization matrix is a default JPEG matrix.

13. At least one non-transitory computer readable medium comprising computer readable instructions that control at least one processor to implement the method of claim 1.

14. A method according to claim 2 wherein the scaling factor is calculated using a Modified Quality Factor.

15. A system according to claim 5 wherein said providing comprises generating the second quantization matrix by: scaling a third quantization matrix by a scaling factor, thereby to provide a scaled matrix, and subsequently computing a weighted average of said at least one scaled matrix with the a first quantization matrix.

16. A system according to claim 5 wherein said providing comprises generating the second quantization matrix according to a proposed compression level.

17. A system according to claim 5 wherein the second quantization matrix is a default JPEG matrix.

18. A system according to claim 16 wherein said proposed compression level is selected by a user using at least one of an Modified Quality Factor and a Quality Factor.

19. A system according to claim 5 wherein said unacceptability criterion comprises said rounding error being more negative than a threshold acceptable rounding value.

20. A system according to claim 19 wherein said threshold acceptable rounding value comprises −0.1.

21. A system according to claim 5 wherein said update is performed for all (row, column) positions in the first quantization matrix and in the second quantization matrix.

22. A system according to claim 5 further comprising utilizing the second quantization matrix for recompressing the image while maintaining the monotonic relationship between the compression extent and the compression quality.

23. A system according to claim 22 wherein said recompressing is a JPEG recompression.

24. A system according to claim 15 wherein the third quantization matrix is a default JPEG matrix.

* * * * *